United States Patent [19]

Shero

[11] Patent Number: 5,265,318
[45] Date of Patent: Nov. 30, 1993

[54] METHOD FOR FORMING AN IN-LINE WATER HEATER HAVING A SPIRALLY CONFIGURED HEAT EXCHANGER

[76] Inventor: William K. Shero, 17287 Mt. Herrmann, Unit A, Fountain Valley, Calif. 92708

[21] Appl. No.: 882,440

[22] Filed: May 13, 1992

Related U.S. Application Data

[63] Continuation-in-part of Ser. No. 724,961, Jun. 2, 1991.

[51] Int. Cl.⁵ .................. H05B 1/02; F24H 1/12; B23P 11/02
[52] U.S. Cl. .................. 29/447; 15/321; 165/156; 392/396; 392/399; 392/484; 392/491
[58] Field of Search .................. 29/447; 392/480–495, 392/396–399; 15/321; 165/156; 219/205

[56] References Cited

U.S. PATENT DOCUMENTS

| | | | |
|---|---|---|---|
| 2,445,115 | 7/1948 | Hanrahan | 165/156 X |
| 2,775,683 | 12/1956 | Kleist | 392/491 |
| 3,835,294 | 9/1974 | Krohn et al. | 392/491 X |
| 4,308,636 | 1/1982 | Davis | 15/321 |
| 4,333,223 | 6/1982 | Germann | 29/447 |
| 4,465,922 | 8/1984 | Kolibas | 392/484 |
| 4,831,236 | 5/1989 | Lemtz et al. | 392/481 |

FOREIGN PATENT DOCUMENTS

| | | | |
|---|---|---|---|
| 1232809 | 4/1960 | France | 219/205 |
| 62-49109 | 3/1987 | Japan | 392/484 |

*Primary Examiner*—Anthony Bartis
*Attorney, Agent, or Firm*—Stetina and Brunda

[57] ABSTRACT

A method for forming an in-line heater for heating water supplied to a hot water carpet cleaning extractor includes the formation of a spiral flange upon the exterior surface of an elongated cylindrical body having a bore therein to define a heat exchanger. The flanged heat exchanger is inserted into a cylindrical housing having an inner diameter smaller than the outer diameter of the spirally flanged heat exchanger by heating the housing to increase the inner diameter thereof sufficiently to allow the spirally flanged heat exchanger to be be received therein. Upon cooling, the housing shrinks into watertight engagement with the spiral flange to define a spiral water floe conduit between the ends of the in-line heater. The first and second ends of the heat exchanger are then welded to the housing. Quick disconnect fittings are threaded into the in-line heater to establish communication with the end of the spiral water conduit. The in-line heater is heated by a removable electric resistance heating element inserted into the bore of the heat exchanger body and controlled by a control thermostat and a overheat cutoff switch.

2 Claims, 3 Drawing Sheets

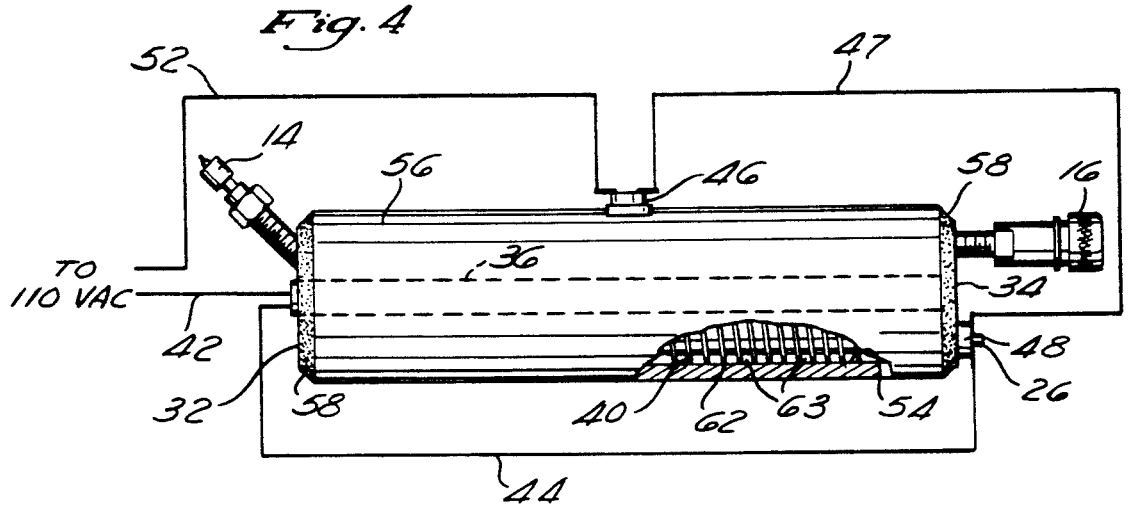
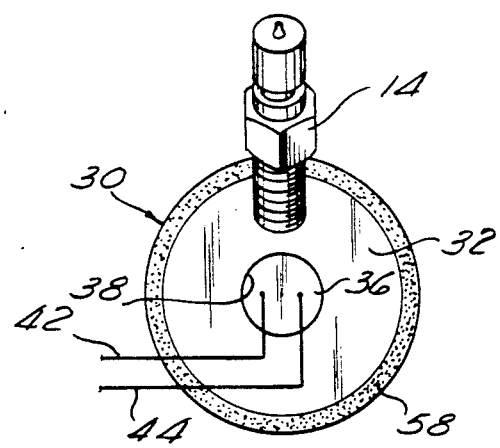
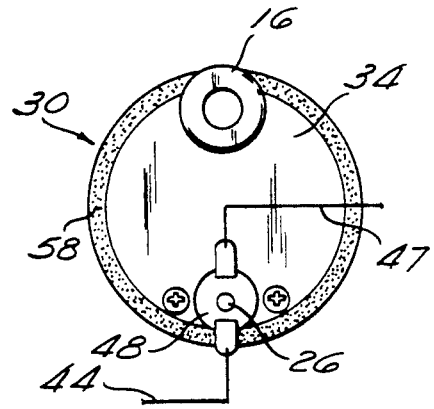
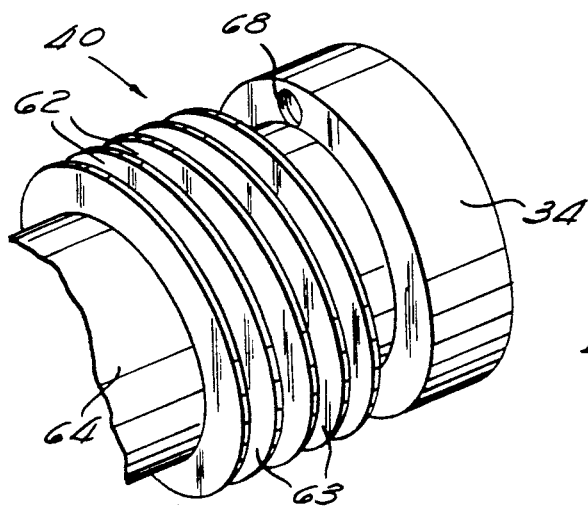

ary mounted upon vehicles and connected to the wand via long hoses. Although the vehicle mounted heater is generally capable of increasing the temperature of the water to be used in the cleaning process to a desire level, the use of such long hoses may cause an appreciable amount of the heat contained within the water to be lost as the water travels through the hoses. Thus, the temperature of the water at the wand, where cleaning is effected, may be lower than desired in such instances. Furthermore, many of the smaller or home carpet cleaning systems utilize heaters which are incapable of adequately heating the water. Thus, although the smaller units are portable and therefore convenient to use, they may not be as effective as desired.

METHOD FOR FORMING AN IN-LINE WATER HEATER HAVING A SPIRALLY CONFIGURED HEAT EXCHANGER

RELATED APPLICATIONS

This Patent Application is a continuation in part of U.S. Design Patent application No. 07/724,961 filed on June 2, 1991, entitled "In-Line Heater For Hot Water Carpet Cleaning Extractors".

FIELD OF THE INVENTION

The present invention relates generally to electrical water heaters and more particularly to an in-line heater for increasing the temperature of water supplied by a hot water carpet cleaning extractor.

BACKGROUND OF THE INVENTION

Carpet cleaning systems that utilize pre-heated water or "steam" to clean carpets are generally well known in the art. Typically these systems direct a source of water through a pump driven by an engine. The pump then directs the water through a safety valve and from there to a heat exchanger. Heated water exits the heat exchanger, passes through a thermostat, and from there the water is directed to a hand held carpet cleaning wand.

The wand houses a trigger mechanism that controls the fluid flow through the wand and out through an exhaust port formed in the end thereof. The fluid is directed downwardly into the carpet being cleaned. The wand also forms a vacuum suction inlet port which directs residual waste water back to a waste water recovery tank that is kept under a vacuum by an engine driven blower or vacuum pump.

Larger carpet cleaning systems are generally mounted upon vehicles and connected to the wand via long hoses. Although the vehicle mounted heater is generally capable of increasing the temperature of the water to be used in the cleaning process to a desire level, the use of such long hoses may cause an appreciable amount of the heat contained within the water to be lost as the water travels through the hoses. Thus, the temperature of the water at the wand, where cleaning is effected, may be lower than desired in such instances. Furthermore, many of the smaller or home carpet cleaning systems utilize heaters which are incapable of adequately heating the water. Thus, although the smaller units are portable and therefore convenient to use, they may not be as effective as desired.

As such, it is desirable to provide a means for increasing the temperature of water flowing through the lines which interconnect the carpet cleaning unit and the wand.

SUMMARY OF THE INVENTION

The present invention specifically addresses and alleviates the above mentioned deficiencies associated in the prior art. More particularly, the present invention comprises a low cost, high performance, in-line heater for rapidly increasing the temperature of water supplied by a hot water carpet cleaning extractor. The present invention generally comprises a housing, a heat exchanger disposed within the housing such that water flows intermediate the heat exchanger and the housing, and a replaceable electrical heating element disposed within the heat exchanger.

The electrical heating element heats the heat exchanger which in turn heats the water flowing intermediate the heat exchanger and the housing. The heat exchanger thus isolates the electrical heating element from the water. The propensity for leakage is mitigated by eliminating the use of leak prone tubing, typically copper tubing, as is common in conventional heat exchangers. The detrimental effects of leakage are mitigated since any leakage which does occur merely results in reduced efficiency of the heat exchanger rather than in leakage of water onto the heating element or into the external environment.

The heat exchanger comprises a generally cylindrical body having a spiral flange extending thereabout such that the spiral flange and the housing define a spiral water conduit from a first end of the in-line heater to a second end thereof. The spiral flange is preferably formed of aluminum by either machining or diecasting. The spiral flange is preferably formed to have a diameter slightly greater than the inner diameter of the housing such that the heat exchanger may be pressed or swaged into the housing when the housing is heated and expands sufficiently to receive the spiral flange such that upon cooling the spiral flange is sealed in a water-tight fashion to the inside of the housing and a spiral conduit is formed thereby. The spiral water conduit facilitates rapid heating of the water passing therethrough by providing a large surface area over which heat is transferred from the heating element to the water.

First and second quick disconnects, disposed at the first and second ends, respectively, of the in-line heater facilitate fluid communication through the spiral water conduit and connection of the in-line heater to the water line of a carpet cleaning system.

A first temperature switch or thermostat in electrical communication with the electrical heating element controls the application of electricity to the electrical heating element such that water flowing through the in-line heater is heated to a desired temperature, preferably approximately 200° F. A second temperature switch or overheat cutoff switch in electrical communication with the electrical heating element terminates the application of electricity to the electrical heating element when the temperature of the water flowing from the in-line heater is greater than a preset value, preferably approximately 250° F.

The temperature and flow rate of the heated water can be varied by varying the cross-sectional area of the water path, i.e. spiral conduit, through the heat exchanger. This may be accomplished by machining the groove intermediate the spiral flange such that it is deeper and/or wider for increased water flow. Providing a thinner spiral flange (and consequently a longer water path or spiral conduit) results in increased heating of the water. Thus, unlike contemporary heat exchangers utilizing copper coils, the temperature and flow rate can be readily varied by machining of the heat exchanger.

The in-line heater for hot water carpet cleaning extractors of the present invention provides a low cost means for rapidly heating water in carpet cleaning systems to supplement the system's existing water heater. This high performance heater thus optimizes the effectiveness of both vehicle mounted and portable carpet cleaning systems.

The in-line heater can alternatively be disposed within a carpet cleaning unit, i.e. water heater, either as an add-on or after-market device or as original equipment.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 4 is an elevational side view of the internal or functional components of the in-line water heater of FIG. 1;

FIG. 5 is an elevational side view of the left side of the functional components of FIG. 4;

FIG. 6 is an elevational side view of the right side of the functional components of FIG. 4;

FIG. 8 is an enlarged perspective view of one end of the heat exchanger.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
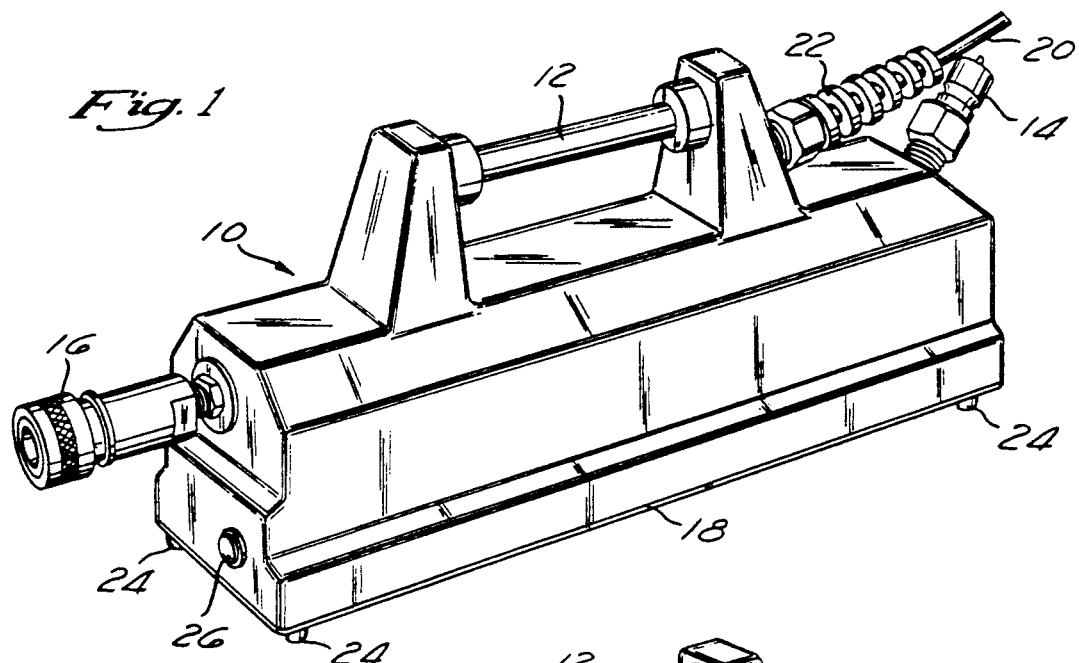
FIG. 1 is a perspective view of the in-line heater of the present invention.
Figure 2:
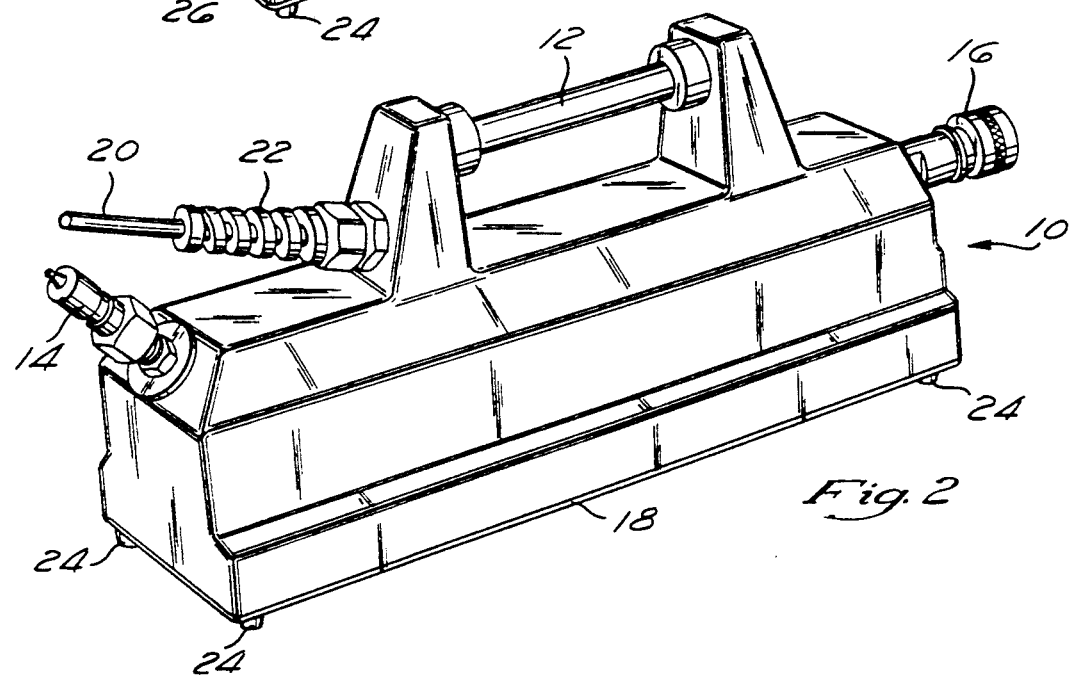
FIG. 2 is a perspective view of the in-line heater of FIG. 1 rotated by approximately 180°.
Figure 3:
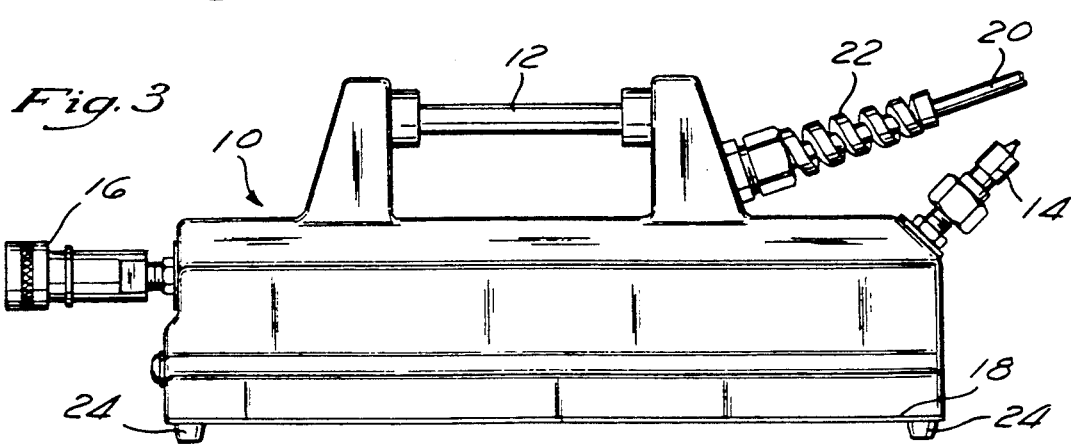
FIG. 3 is an elevational side view of the in-line water heater of FIG. 1.

The in-line heater of the present invention is illustrated in FIGS. 1 through 8 which depict a presently preferred embodiment. Referring now to FIGS. 1-3, the in-line heater is comprised generally of a substantially rectangular cover 10 having a handle 12 formed thereon and an inlet or male quick disconnect 14 disposed at a first end thereof and an outlet or female quick disconnect 16 formed at the second end thereof. The housing 10 is preferably comprised of a heat resistant plastic material, preferably injection molded as an integral unit. Those skilled in the art will recognize that various other materials, i.e. metal, are likewise suitable. A metal base plate 18, preferably aluminum, seals the bottom of the housing 10. The base plate 18 is secured to the housing 10, via fasteners, preferably screws (not shown).

A power cord 20 extends from the housing 10 and is preferably supported by strain relief 22. Four feet 24 extend from the base plate 18 a sufficient distance to provide for the flow of air beneath the in-line heater and to prevent over heating of the surface, i.e., floor, upon which the in-line heater is operatively disposed. The screws which attach the base plate 18 to the housing 10 preferably pass through the feet 24 thus securing both the feet 24 and the base plate 18 to the housing 10. Reset button 26 extends from the housing 10.

The male quick disconnect 14 facilitates attachment to a complimentary female quick disconnect (not shown) formed upon the carpet cleaner water line and the female quick disconnect 16 facilitates attachment to a complimentary male quick disconnect (not shown) attached to the wand.

Referring now to FIGS. 4-6, disposed within the housing 10 (of FIGS. 1-3) is an elongate, generally cylindrical heater assembly 30 having first and second ends 32 and 34, respectively. The water inlet or male quick-disconnect 14 is formed upon the first end 32 of the heater assembly 30 and the water outlet or female quick disconnect 16 is formed upon the second end 34 of the heater assembly 30. A removable heating element 36 extends longitudinally through a bore 38 (best seen in FIG. 7) formed along the length of a heat exchanger 40. A first temperature switch or control thermostat 46 is disposed atop the heater assembly 30 and a second temperature switch or overheat cutoff switch 48 is disposed at the second end 34 of the heater assembly 30 proximate the water outlet or female quick disconnect 16.

First 42 and second 44 conductors extend from the heating element 36. The first conductor 42 extending from the heating element 36 connects to a plug (not shown) to facilitate connection to 110 VAC and the second conductor 44 provides electrical connection from the heating element 36 to overheat outoff switch 48 disposed proximate the water outlet or female quick disconnect 16. The overheat cutoff switch 48 has reset button 26 formed thereon. Conductor 47 provides electrical interconnection of the overheat cutoff switch 48 with the thermostat 46. Conductor 52 provides electrical interconnection of the thermostat 46 with the plug (not shown) to provide 110 VAC. Those skilled in the art will recognize that various other electrical configurations are likewise suitable for making the electrical heating element 36 responsive to the thermostat 46 and the overheat cutoff switch 48.

A heat exchanger 40 (best shown in FIG. 7) is disposed within the heater assembly 30 about the electrical heating element 36. The heat exchanger 40 receives heat, primarily by conduction, from the electrical heater element 36 and radiates the heat received therefrom into the water to be heated.

Figure 7:
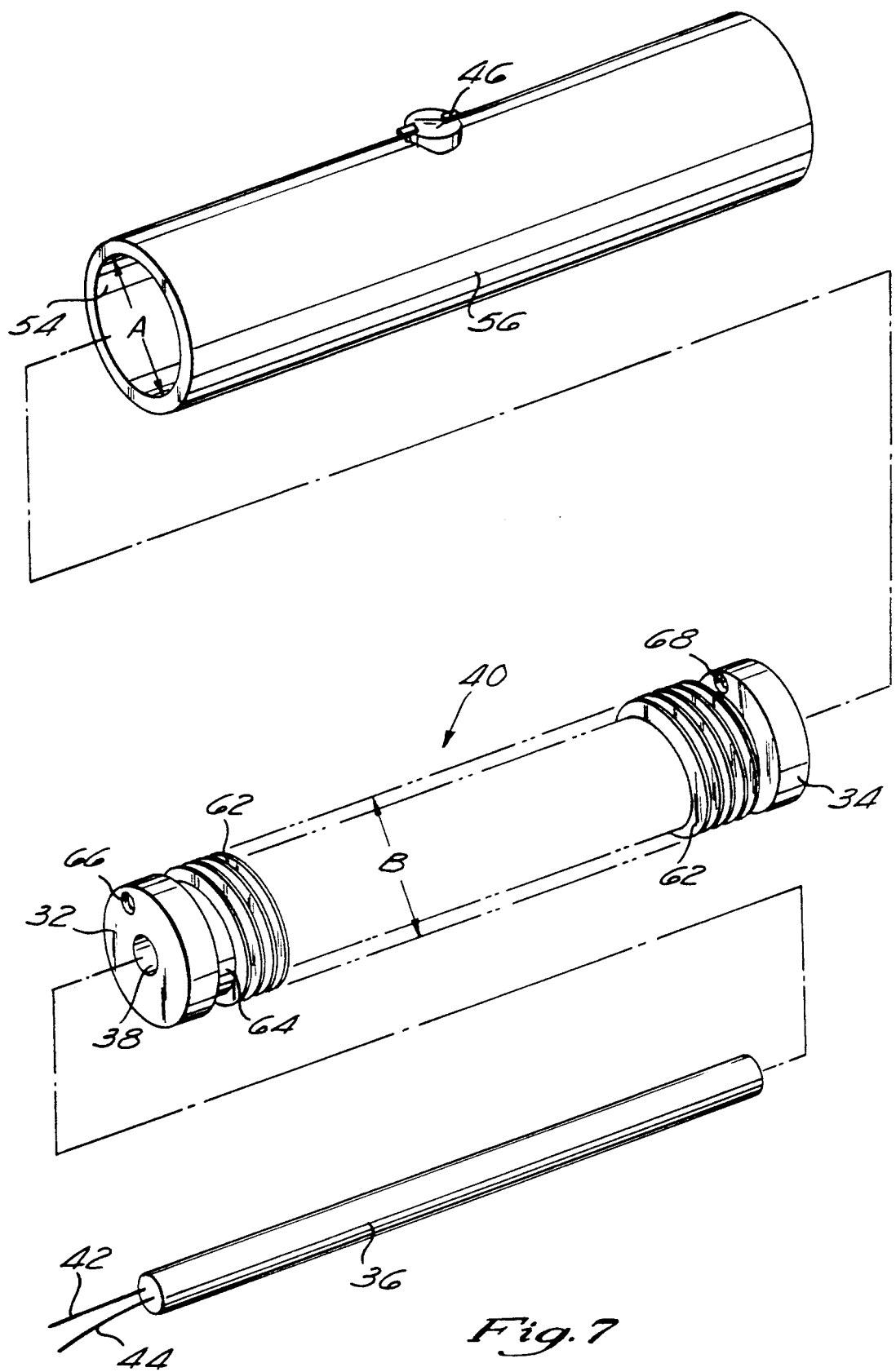
FIG. 7 is a perspective view of the housing, heat exchanger, and electrical heating element of FIG. 4.

Referring now to FIGS. 7 and 8, the replaceable electrical heating element 36 is preferably an elongate resistive heater disposed within an insulating housing such as those manufactured by Selco Products Company of Buena Park, Calif. The electrical heating element 36 is disposed within the bore 38 of heat exchanger 40 and secured in place with a high temperature adhesive such at RTV silicone rubber.

The heat exchanger 40 is preferably comprised of aluminum. The spiral flange 62 is preferably formed by either machining or diecasting. Those skilled in the art will recognize that various other methods for forming the spiral flange 62 are likewise suitable.

The heat exchanger 40 is in turn disposed within bore 54 of cylindrical housing 56 such that the first 32 and second 34 ends thereof extend approximately ¼ inch from either end of the housing 56. Fillet welds 58 (shown in FIG. 4) provide watertight attachment of the first 32 and second 34 ends of the heat exchanger 40 to the housing 56.

The heat exchanger 40 further comprises a spirally configured rib or flange 62 (best shown in FIG. 8)

which extends outwardly from a body 64. Grooves 63 are defined intermediate adjacent spiral flanges 62. The spiral flange 62 has an outer diameter B slightly greater than the inner diameter A of the bore 54 of the cylindrical housing 56. Thus, to insert the heat exchanger 40 into the bore 54 of the housing 56, the housing 56 must be heated sufficiently to increase the inner diameter A thereof sufficiently to receive the spiral flange 62 of the heat exchanger 40 as discussed below. Thus, a spiral water conduit is defined from the threaded water inlet aperture 66, intermediate adjacent spiral flanges 62, to threaded water outlet aperture 68. That is, water flows through the threaded water inlet aperture 66, then spirals through the spiral flange 62 to the threaded water outlet aperture 68. Housing 56 constrains water flow to the grooves 63 and prevents water flow over spiral flange 62 into adjacent grooves 63, thus forcing water to flow the entire length of the spiral grooves 63 to achieve maximum heating thereof.

The amount of heat transferred to the water and the flow rate can be varied by varying the size, i.e. cross-sectional area, of the spiral groove 63. Thus, by making the spiral groove 63 larger, i.e. wider and deeper, the flow rate can be increased. By making the water path or spiral conduit defined by the spiral groove 63 longer, the amount of heat transferred to the water can be increased. The spiral conduit can be made longer by making the spiral flange 62 thinner, thus increasing the number of turns of the spiral flange 62. By increasing the length of the spiral conduit, the water passing therethrough has more time to absorb heat from the heat exchanger and therefore exits the in-line heater at a higher temperature.

Threaded water inlet aperture 66 receives the water inlet or male quick disconnect 14 and threaded water outlet aperture 68 likewise receives the water outlet or female quick disconnect 16.

In the in-line water electrical heating element 36 of the present invention, the heater is completely isolated from the water since the electrical heating element 36 is disposed within the bore 38 of the heat exchanger and is separated from water flow by the body 64 thereof. Thus, the electrical heating element is separated from the water by a layer of aluminum which is approximately ¼ to ½ inch thick, preferably approximately ⅜ inch thick, such that water leakage therethrough is extremely unlikely.

By eliminating the use of copper coils, the propensity for leakage is substantially reduced. By utilizing the spiral flange of the present invention, the consequence of any leakage is minimized. Leakage in the present invention merely results in reduced efficiency of heating, rather than potential electrical hazard. That is, any leakage is likely to be among adjacent grooves, i.e. over the spiral flange, such that the leaking water merely does not travel the full path of the spiral groove 63 and thus is not heated optimally. Since any water leaking in this manner does not come into contact with the electrical heating element 36 or any of the wiring of the in-line water heating, electrical hazards are minimized.

Having described the structure of the in-line heater for hot water carpet cleaning extractors of the present invention, it may be beneficial to describe the operation thereof. The in-line heater is particularly useful in those instances where either the heater of the carpet cleaning device is inadequate to heat the water utilized in the cleaning process to a desired temperature or the temperature of the water drops due to the use of excessively long lines between the heater and the wand. In either instance, the in-line heater of the present invention is inserted into the line intermediate the heater and the wand, preferably within a short distance of the wand to prevent excessive cooling of the water so heated. The in-line heater of the present invention is inserted by disconnecting the wand from the water line and connecting the female quick disconnect of the line to the male quick disconnect 14 of the in-line heater. The female quick disconnect 16 of the heater is then connected to a complimentary male quick disconnect which provides attachment to the wand.

Upon connecting the electrical plug of the in-line heater to 110 VAC, the electrical heating element 36 thereof begins to heat water flowing through the in-line heater. The first or non-resettable temperature switch 46 provides thermostatic control of the electrical heating element 36 such that water passing through the in-line water heater of the present invention is heated to a desired temperature, preferably 200° F. The first temperature switch or control thermostat 46 is electrically connected in series with the electrical heating element 36 and provides electrical conduction thereto when a temperature is sensed thereby corresponding to a water outlet temperature of less than approximately 200° F. When the water temperature exiting the in-line heater reaches a temperature in excess of approximately 200° F., the thermostat 46 opens and discontinues the application of electrical power to the electrical heating element 36 until the temperature of water exiting the in-line water heater is once again below 200° F.

The thermostat 46 does not sense the temperature of the outlet water directly, but rather measures the temperature of the housing 56 which corresponds directly thereto. Thus, those skilled in the art will recognize that by utilizing a first temperature switch or thermostat 46 which opens at the appropriate housing 56 temperature, the temperature of the water exhausted from the in-line heater can be controlled at a desired level.

Also electrically interconnected in series with the electrical heating element 36 is the manually resetable second temperature switch or overheat outoff switch 48 which functions as an emergency out off means for discontinuing the application of electrical power to the electrical heating element 36 in the event that the temperature of the water exhausted from the in-line water should exceed a preset level in excess of that controlled by the thermostat 46, preferably cutting off electrical power to the electrical heating element 36 at a temperature of approximately 250° F. Thus, in the event that the thermostat 46 should fail to discontinue the application of electrical power to the heating element 36 or some other malfunction should occur wherein the electrical heating element 36 continues to heat the water to a temperature of approximately 250° F., the overheat cutoff switch 48 discontinues the application of electrical power to the electrical heating element 36.

When the overheat cutoff switch 48 is activated, i.e. senses that the temperature of the water exhausted by the in-line water heater exceeds approximately 250° F., reset button 26 pops out of or extends therefrom. Resetting or depressing the button 26 resets the overheat cutoff switch 48, thus reapplying power to the electrical heating element 36. The reset button 26 will not remain depressed, i.e. the overheat cutoff switch 48 will not reset, until the temperature of the water exhausted from the in-line water heater is below approximately 250° F. Thus, electrical power cannot be reapplied to the electrical heating element 36 until the temperature of the water exhausted by the in-line water heater is below approximately 250° F. As with the first temperature switch or thermostat 46, the second temperature switch or overheat cutoff switch 48 need not measure the temperature of the water exhausted from the in-line water heater directly, but rather may measure the temperature of the housing 56 or other convenient component of the in-line water heater whose temperature is directly proportional to the temperature of the water exhausted from the in-line water heater.

The in-line heater of the present invention is portable and thus easily carried and placed into use as desired. The electrical heating element 36 is easily replaceable by simply opening the cover 10, i.e. removing the base plate 18 therefrom, and pulling the electrical heating element 36 from the heat exchanger 40. A new electrical heating element 36 is then inserted into the bore 38 of the heat exchanger 40 and secured in place, preferably utilizing a high temperature adhesive such as RTV.

Various uses other than for heating water for carpet cleaning are anticipated. For example, the present invention could be used to heat water for a variety of cleaning tasks, e.g., the cleaning of concrete, tile, etc. Furthermore, it is additionally contemplated that the present invention may be utilized in various non-cleaning capacities.

The use of the first 46 and second 48 temperature switches mitigates the potential for overheating of the water exhausted from the in-line water heater of the present invention and thus enhances safety. A thermometer or temperature gauge may optionally be attached proximate the outlet 16 to provide an indication of the temperature of water exhausted by the in-line water heater.

It is understood that the exemplary in-line heater for hot water carpet cleaning extractors of the present invention described herein and shown in the drawings represents only a presently preferred embodiment thereof. Indeed, various modifications and additions may be made to such embodiment without departing from the spirit and scope of the invention. For example, neither the housing nor heat exchanger need be generally cylindrical in configuration, those skilled in the art will recognize that various other configurations, i.e. square, rectangular, oval, triangular, etc., are likewise suitable. It is only necessary that the flange extending about the heat exchanger be sealable in a watertight fashion to the cover. Also, various heating means other than an elongate electrical heating element may be utilized, i.e. a series of smaller heating elements for example. The in-line heater need not be disposed outside of a contemporary carpet cleaning unit, but rather may be located therein. Thus, these and other modifications and additions may be obvious to those skilled in the art and may be implemented to adapt the present invention for use in a variety of different applications.

What is claimed is:

1. A method for forming an in-line heater for increasing the temperature of water supplied by a hot water carpet cleaning extractor, the method comprising the steps of:
   a) forming a spiral flange upon a generally cylindrical body having a bore formed axially therein to define a heat exchanger;
   b) disposing the spirally flanged heat exchanger within a cylindrical housing such that the spiral flange and the housing define a spiral water conduit from a first end of the in-line heater to a second end thereof;
   c) welding the first and second ends of the heat exchanger to the housing; and
   d) wherein the diameter of the spiral flange is greater than the inner diameter of the housing and the step of disposing the heat exchanger within the housing comprises heating the housing sufficiently that the inner diameter thereof is greater than the diameter of the spiral flange.

2. The method as recited in claim 1 further comprising the steps of attaching first and second quick disconnects at the first and second ends, respectively, of the in-line heater, such that fluid communication through the spiral water conduit is facilitated thereby.

* * * * *